(12) United States Patent
Hoggan

(10) Patent No.: US 9,800,581 B2
(45) Date of Patent: Oct. 24, 2017

(54) AUTOMATED WIRELESS DEVICE PROVISIONING AND AUTHENTICATION

(71) Applicant: Cable Television Laboratories, Inc., Louisville, CO (US)

(72) Inventor: Stuart Hoggan, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 361 days.

(21) Appl. No.: 14/459,909

(22) Filed: Aug. 14, 2014

(65) Prior Publication Data

US 2015/0264051 A1   Sep. 17, 2015

Related U.S. Application Data

(60) Provisional application No. 61/953,271, filed on Mar. 14, 2014.

(51) Int. Cl.
| | |
|---|---|
| *G06F 17/00* | (2006.01) |
| *H04L 29/06* | (2006.01) |
| *H04W 12/06* | (2009.01) |

(52) U.S. Cl.
CPC ......... *H04L 63/0892* (2013.01); *H04W 12/06* (2013.01); *H04L 63/083* (2013.01)

(58) Field of Classification Search
CPC ... H04L 63/0892; H04L 63/83; H04L 63/083; H04L 63/20; H04L 63/08; H04L 63/102; H04W 12/06
USPC ....................................................... 726/1–5
See application file for complete search history.

(56) References Cited

U.S. PATENT DOCUMENTS

| | | | | |
|---|---|---|---|---|
| 7,275,046 | B1* | 9/2007 | Tritt ..................... | G06Q 20/102 705/36 R |
| 8,060,389 | B2* | 11/2011 | Johnson ................ | H04L 69/329 705/6 |
| 8,073,565 | B2* | 12/2011 | Johnson .............. | H04W 76/021 455/404.2 |
| 9,258,706 | B2* | 2/2016 | Gupta .................. | H04W 12/06 |
| 9,635,555 | B2* | 4/2017 | Gupta .................. | H04W 12/08 |
| 2013/0312074 | A1* | 11/2013 | Sarawat ............... | H04W 12/06 726/7 |
| 2014/0134980 | A1* | 5/2014 | Singh ................... | H04L 9/3263 455/411 |
| 2014/0185597 | A1* | 7/2014 | Gupta ................. | H04L 63/0823 370/338 |
| 2015/0180978 | A1* | 6/2015 | Canpolat .............. | H04L 5/0092 370/329 |

(Continued)

*Primary Examiner* — Thu Ha Nguyen
(74) *Attorney, Agent, or Firm* — Great Lakes Intellectual Property, PLLC.

(57) ABSTRACT

Automated provisioning and/or authentication of a device to a wireless access point is contemplated. The automated provisioning may be performed in a manner that enables the device to receive provisioning instructions in accordance with HotSpot 2.0, Passpoint or other Wi-Fi related protocols and standards without having to input identification or other user-specific information like a username and password combination. The authentication may be performed in a manner sufficient to enable service-level differentiation for the provisioned devices and/or other devices desiring wireless access, such as but not necessary limited to facilitating assigning different bandwidth speed/priorities according to a service agreement.

20 Claims, 5 Drawing Sheets

(56) References Cited

U.S. PATENT DOCUMENTS

| | | | |
|---|---|---|---|
| 2015/0264051 A1* | 9/2015 | Hoggan | H04L 63/0892 |
| | | | 726/1 |
| 2015/0281966 A1* | 10/2015 | Griot | H04W 12/08 |
| | | | 726/5 |
| 2015/0282042 A1* | 10/2015 | Griot | H04W 40/04 |
| | | | 370/329 |
| 2016/0183169 A1* | 6/2016 | Horn | H04W 48/14 |
| | | | 709/225 |
| 2016/0219038 A1* | 7/2016 | Stephenson | H04L 63/0823 |
| 2016/0226981 A1* | 8/2016 | McCann | H04L 67/146 |
| 2017/0111783 A1* | 4/2017 | Zhang | H04W 8/20 |

* cited by examiner

AUTOMATED WIRELESS DEVICE PROVISIONING AND AUTHENTICATION

CROSS-REFERENCE TO RELATED APPLICATIONS

This application claims the benefit of U.S. provisional Application No. 61/953,271 filed Mar. 14, 2014, the disclosure of which is incorporated in its entirety by reference herein.

TECHNICAL FIELD

The present invention relates to provisioning wireless devices with capabilities sufficient to facilitate automated connection to an access point and/or authenticating wireless devices to an access point for the purposes of establishing access privileges.

BACKGROUND

Subscribers commonly use devices with Wi-Fi network interfaces and other wireless access points for the convenience of wireless mobility when accessing Internet services at home or in public place as well as offloading traffic from the expensive cellular network. Provisioning these devices can be complicated for subscribers, especially for secure Wi-Fi networks

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
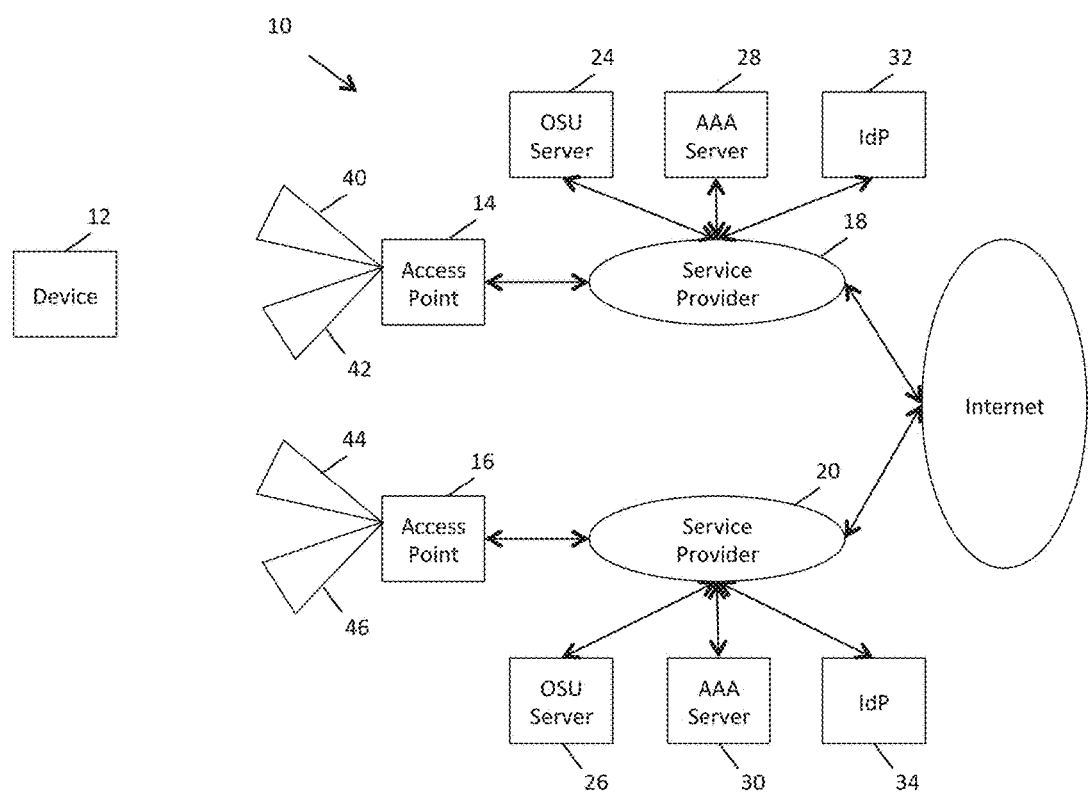
FIG. 1 illustrates a system in accordance with one non-limiting aspect of the present invention.

FIG. 1 illustrates a system 10 in accordance with one non-limiting aspect of the present invention. The system 10 may be configured in accordance with the present invention to facilitate automated provisioning and/or authentication of a device 12 to one or more wireless access points. The automated provisioning may be performed in a manner that enables the device 12 to receive provisioning instructions in accordance with HotSpot 2.0 and/or Passpoint, the disclosures of which are hereby incorporated by reference in their entireties, or other Wi-Fi related protocols and standards without having to input identification or other user-specific information like a username and password combination. The authentication may be performed in a manner sufficient to enable service-level differentiation for the provisioned devices and/or other devices desiring wireless access, such as but not necessary limited to facilitating assigning different bandwidth speed/priorities according to a service agreement. The present invention predominately describes the provisioning and authentication with respect to wireless signals being exchanged between the device 12 and one of the access points 14, 16 for exemplary non-limiting purposes as the present invention fully contemplates facilitating provisioning and authentication of wireline signals and/or services.

The access points 14, 16 are shown for exemplary non-limiting purposes as being associated with different service providers 18, 20 where each service provider 18, 20 is tasked with facilitating signaling between the access points 14, 16 and the Internet. The service providers 18, 20 may correspond with any type of service provider (SP), such as but not necessary limited to an Internet service provider (ISP), a multiple system operator (MSO), voice over Internet protocol (VoIP) a cellular phone operator, a cable television service provider, etc. The service providers 18, 20 are shown to be facilitating signal exchanges over the Internet, such as to enable the device 12 to access content, services or other media available over the Internet while traveling from the first access point 14 to the second access point 16. This is done for exemplary non-limiting purposes as the present invention fully contemplates the service providers being the same service provider 18, 20 and/or facilitating access to services or signaling not otherwise carried over the Internet and/or the device being provisioned/authenticated to access services without having to roam or otherwise navigate from one access point to another access point 14, 16, e.g., provisioning and authenticating the device to connect to a single access point.

The device 12 may be any type of mobile or non-mobile device having capabilities sufficient to facilitate access to the Internet through either one of the first and second access points 18, 20. The device 12 may be a cellular or other phone, computer, laptop, tablet, personal digital assistant (PDA), set top box (STB), media terminal adapter (MTA), etc. While the description is predominately set forth with respect to a single device 12, the present invention fully contemplates its use with any number of devices 12, including simultaneously supporting access of any number of devices 12 to the Internet through any number of access points 18, 20. The device 12 may include a client application embodied in a computer-readable medium having stored thereon a plurality of instructions including instructions which, when executed by a processor, cause the processor to facilitate the operations contemplated by the present invention. The client application or other feature of the device 12, for example, may be a web browser having capabilities sufficient to facilitate establishing Web-based connections to the Internet gateway controller 16 to facilitate web browsing related operations.

Each of the service providers 18, 20 are shown to be associated with an online sign-up (OSU) server 24, 26, an Authentication, Authorization and Accounting (AAA) server 28, 30 and an identity provider (IdP) 32, 34. The OSU server 24, 26 may correspond with that described in the Hotspot 2.0 and/or Passpoint specifications to facilitate provisioning devices to automatically connect to a desired one of the access points 14, 16. The OSU server 24, 26 may be configured to provide provisioning/configuration information to the device 12 sufficient to facilitate automatically connecting to the desired one or more of the access points 14, 16. The provisioning/configuration information may include authentication and key exchange capabilities, credential installation, link layer encryption and WPA 2-enterprise security related capabilities. The OSU server 24, 26 may also be configured to provide the device 12 with a selection policy or other information related to identifying or otherwise arbitrating/determining a suitable one of the access points 14, 16 or a suitable extended service set (ESS) 40, 42, 44, 46 being broadcasted by one or more of access points 14, 16 through which the operations necessary to connect to desired one or more of the access points 14, 16 may be performed.

The IdP 32, 34 may be configured to facilitate authenticating the device 12. The IdP 32, 34 may be configured to facilitate various security related operations, including issuing trusted authentication session tokens and assertions, and optionally to operate in cooperation with the AAA server 28, 30. The IdP 32, 34 may be configured to issue the related certificates and keys or other security-related data sets according to the pre-association between the device 12, the addresses assigned to the device 12, the addresses assigned to the access points 14, 16 and/or the username and password associated with the user (subscriber). The MSO may include an authorized IP address database or other database to facilitate generating a cross-reference or other relational association of the addresses, users, and username and password combinations. The IdP 32, 34 may communicate with the databases to facilitate assessing the device 12 and/or other devices attempting to connect to either one of the illustrated first and second access points 14, 16 or other access points associated with the MSO in order to facilitate the convenient sign-on processes contemplated by the present invention. The AAA servers 28, 30 and the IdPs 32, 34 or other such backend features of the service providers may be configured to facilitate the operations described herein and those described in U.S. patent application Ser. Nos. 13/423,359; 13/536,194 and 13/798,290, the disclosures of which are hereby incorporated by reference in their entireties.

The access points 14, 16 may be configured to communicate with the backend components of their corresponding service provider 18, 20 in order to facilitate operations contemplated herein. The access points 14, 16 are shown for exemplary non-limiting purposes to correspond with a gateway, CM or other device having capabilities sufficient to facilitate interfacing signals with the device and the service provider, optionally by way of a cable modem termination system (CMTS) or other suitable mechanism connected therebetween. The connection between the access point and the service providers are shown to occur over a wireline communication medium, such as a hybrid-fiber-coaxial (HFC) network, an optical network or other wireline means, for exemplary non-limiting as the present invention fully contemplates similar communications occurring over a wireless medium/network. The access points are each shown to support multiple ESSs, which for exemplary non-limited purposes are described herein as an OSU ESS and a production ESS. The ESSs may occupy the same wireless channel and/or different wireless channels and may be transmitted to facilitate enabling the device to identify a connection to the access point suitable to performing the operations and processes contemplated herein.

Figure 2:
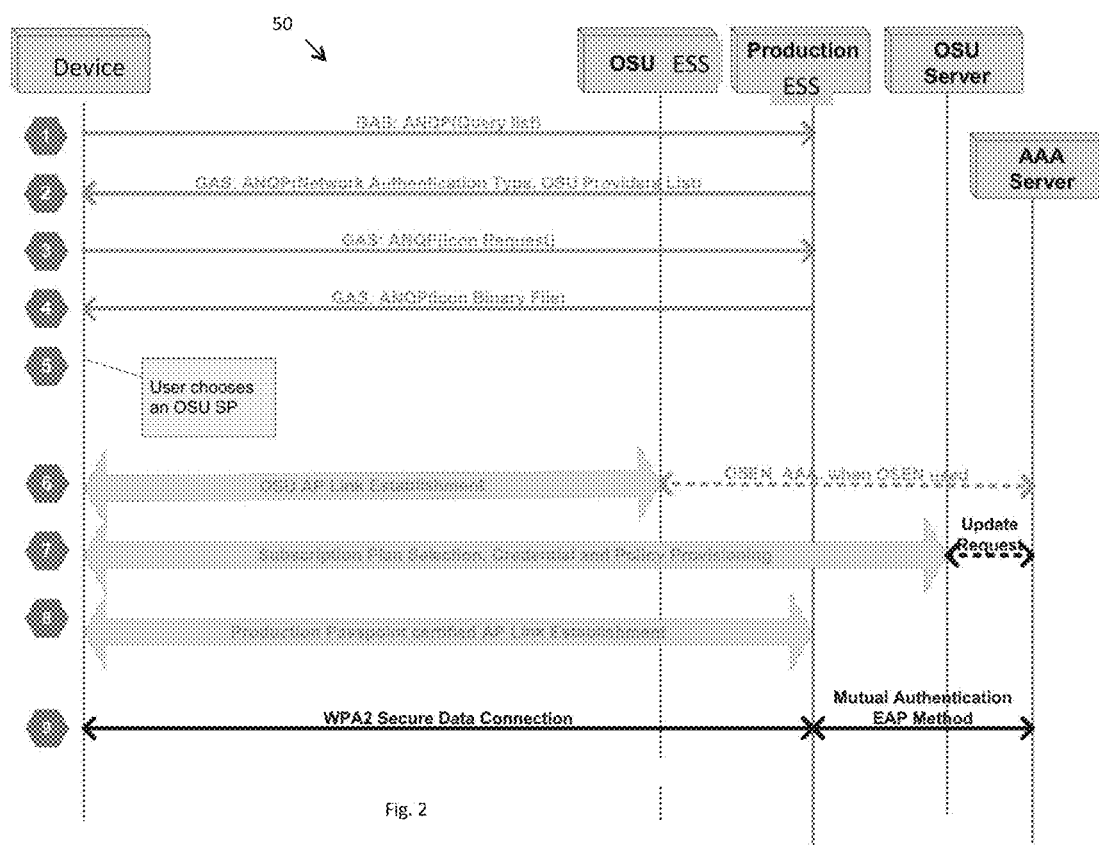
FIG. 2 illustrates a diagram of a method for automatically provisioning a device in accordance with one nine-limiting aspect of the present invention

FIG. 2 illustrates a diagram 50 of a method for automatically provisioning a device to connect to an access point in accordance with one nine-limiting aspect of the present invention. The method is described with respect to the device being a mobile device having capabilities sufficient to facilitate moving from one access point to another access point, such as but not necessary limited to a mobile phone, a tablet or a laptop. The access point is shown to advertise an OSU ESS and a production ESS for the purposes of respectively facilitating an OSU operation and providing network access. The OSU operation may correspond with facilitating message exchange and other signaling associated with an OSU server provisioning the device with a credential, a selection policy and/or other information necessary to facilitate automatically connecting to the production ESS. The production ESS may correspond with use of the connected-to access point to facilitate exchanging information, data, signals or other media associated with the network access provided by corresponding service provider, e.g., facilitating packet transmissions over the Internet, video-on-demand (VOD), television transmissions, etc. The services made available through the access point by way of the production ESS may be dictated by a subscription or other entitlement associated with the device or a user thereof. The AAA server may be configured to authenticate the device to the access point and/or otherwise facilitate authenticating the device to the appropriate portion of the subscriptions and/or entitlements.

The method may include a number of processes and interactions between the various devices, which for exemplary purposes are labeled with reference numerals 1-9. Processes 1-5 may correspond with discovery and selection of a service provider (SP) associated with the device or a user of the device. One non-limiting aspect of the present invention contemplates a scenario where various service providers may enable devices from subscribers and non-subscribers to interact with access points within their domain/control. The service providers may include a contractual relationship where the subscribers of one service provider are entitled or otherwise enabled to access services while connected to an access point of another service subscriber, i.e., when roaming to an unaffiliated access point. The corresponding processes 1-5 may relates to processes described in the Hotspot 2.0 specification, which my include: process 1: The mobile device issues an ANQP Query for the Network Authentication Type and OSU Provider information; process 2: The AP returns the Network Authentication Type and OSU Providers List elements to the mobile device. If the Network Authentication Type message indicates that OSU is available, then the OSU Providers list element contains the OSU SSID and at least one online sign-up provider; process 3: The mobile device may request an OSU Provider Icon of the desired size in pixels using the Icon Request HS2.0 ANQP-element. Note: in this example exchange, an icon is requested by the client device. Request of the icon is optional; process 4: If an icon was requested, the AP returns the Icon Binary File for the requested icon. If the OSU Providers list element contains more than one OSU provider, steps 3 and 4 can be repeated for each provider; process 5: The mobile device displays on its UI a list of available OSU provider icon(s) and/or friendly name(s). If the user selects an icon and/or friendly name, indicating that online sign up for a subscription is desired, the mobile device continues with process 6; and process 6: The client device connects to the user-selected OSU ESS.

Process 7 may correspond with user providing the information needed by the SP to sign up for a subscription. This process may include the client device initiating a Transport Layer Security (TLS) connection with the OSU server via the OSU ESS. The access point may monitor the corresponding TLS messaging to facilitate insertion of an OSU tag if the client device is detected to be near the OSU AP (using NFC, Bluetooth and/or WPS). The OSU tag may be used to provide and in-home status and an identifier of the access point, e.g., unique set of values referencing modem ID, such as but not necessary limited to a media access control (MAC) address. The OSU server checks the tag and if the in-home status is on and the modem ID is authorized for service, the OSU server automatically provisions credentials/info to the client device without requesting info from the user. Credentials (certificate or username/password) and optionally network-selection policy are provisioned on the mobile device. When credentials are provisioned, the OSU server sends an update request to the AAA Server with the mobile device's provisioned credential, such as to enable the AAA server to associate entitlements or other service-level differentiators with the credentials. Optionally, the OSU server may be configured to install an authentication session token/cookie in a browser of the device as part of the automated provisioning process. This token may be used to support zero sign-on (ZSO) when the user connects to online services from MSO business partners on any access network. (It may be assumed that the OSU server also provides federated IdP server functions and shares the same domain name.) The authentication cookie may be suitable for use when browsing the Internet using the browser in order to enable zero sign-on (ZSO) access to online services accessed over the Internet via the production ESS, such as in the manner described in U.S. patent application Ser. No. 13/536,194.

Process 8 may relate to the device dissociating from the OSU ESS and associating with the production ESS using the newly provisioned credentials. Process 9 may relate to the device and the access point establishing a WPA2-Enterprise security association where the user may be granted full access privileges according to their subscription. When the mobile device performs authentication with the AAA server, the AP may be configured to add or otherwise insert a Modem ID Tag (identifier) to the EAP-TLS messaging exchange between the device and the AAA server via the production ESS. The AAA server may check the Modem ID tag to see if the subscriber is using their own residential modem (access point). If they are, their traffic may be assigned bandwidth speed/priorities according to their service agreement. If they are not, their traffic is assigned public bandwidth settings, typically best effort. This supports subscriber roaming. The ability to differentiate whether the devices connecting to their own residential access point or that of another user or service provider may be beneficial in enabling service-level differentiation such that different levels of service may be provided depending on where the devices attempting to access services.

Figure 3:
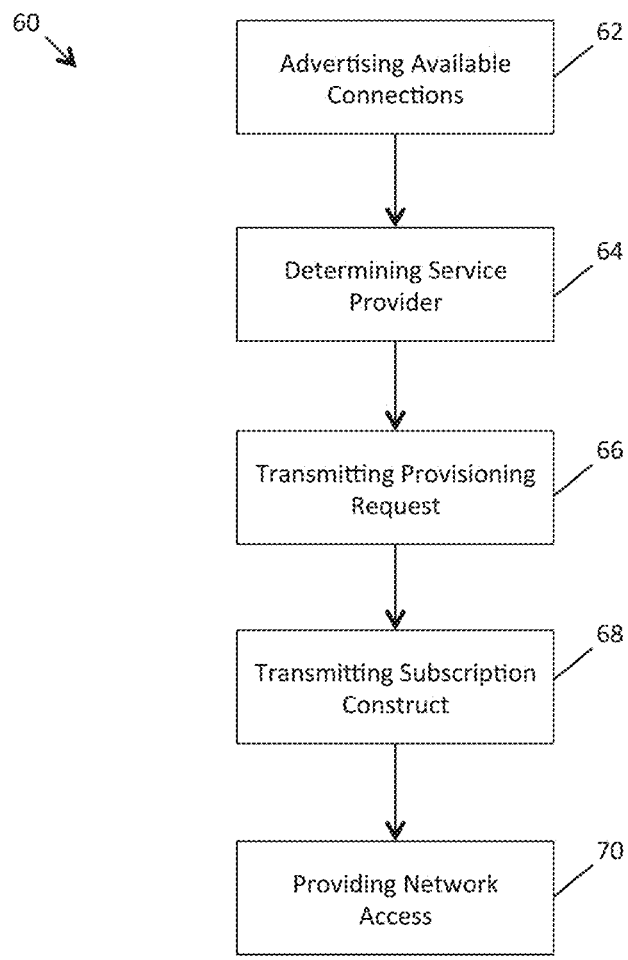
FIG. 3 illustrates a flowchart of method for controlling an access point in accordance with one non-limiting aspect of the present invention.

FIG. 3 illustrates a flowchart 60 of method for controlling an access point to facilitate provisioning and/or authentication in accordance with one non-limiting aspect of the present invention. The method may be embodied in a non-transitory computer-readable medium having a plurality of instructions operable with a processor or other logically executing feature of the access point and sufficient to facilitate the operations contemplated herein. The access point may be configured in accordance with the present invention to facilitate the operations described herein as well as with the capabilities and functionality described in Hotspot 2.0. Block 62 relates to controlling the access point to advertise available connections, which for exemplary non-limiting purposes are described with respect to the above-noted OSU ESS and production ESS. The advertised connections may be those that can be ascertained by a mobile device or other device attempting to connect via the access point to a network. The OSU ESS and the production ESS may be differentiated in order to enable devices compliant with Hotspot 2.0 to readily identify connections available on access point sufficient to facilitate completing an OSU operation and thereafter subsequently provisioning a connection sufficient to obtain network access.

Block 64 relates to determining a service provider associated with the device. The service provider may be determined by the access point advertising various service providers available through the access point, such as by communicating corresponding information via the production ESS. The device may include capabilities sufficient to display a human-machine interface (HMI) or other interface to a user of the device for the purposes of selecting the desired service provider. Block 66 relates to facilitating transmission of an OSU request to the identified service provider. The transmission OSU request may correspond with the device attempting to obtain provisioning information, credentials, etc. necessary to facilitate obtaining network access from the OSU server via the access point. The access point may facilitate transmission of the OSU request by establishing a suitable link with the device via the OSU ESS and subsequently facilitating establishment of a secured link between the device and the OSU server, e.g., using a tunnel established according to TLS. The OSU request may be included as part of various TLS messages exchanged via the tunnel between the device and the OSU server. The OSU server may perform an OSU operation via messages exchanged through the TLS tunnel in order to verify the device for provisioning. Once verified, provisioning information may be transmitted to the device for subsequent use in connecting to the production ESS.

Block 68 relates to transmitting a subscription construct. The subscription construct may be used for the purposes of authorizing entitlements associated with the device. The access point may facilitate transmission of the subscription construct by actively generating messages and/or passing messages therethrough. One non-limiting aspect of the present invention contemplates generating the subscription construct to include an in-home status and an access point identifier. The in-home status may be used to assess the proximity of the device relative to the access point, e.g., whether the device is within a near field range to the access point. The access point identifier may be used to uniquely identify the access point being used to communicate with the OSU server, which the OSU server may utilize for the purposes of determining whether to automatically provision the device or to require the user device to provide identifying information, such as a username and password combination. One non-limiting aspect the present invention contemplates the subscription construct being an authentication token/cookie where the authentication token/cookie may be generated by the OSU server in response to information collected from the device. The access point may be configured to relay or otherwise facilitate transmission of the authentication token/cookie to the device so as to enable the authentication token/cookie to be installed within the browser of the device for the purposes of facilitating ZSO access to online services.

Block 70 relates to the access point facilitating network access to the device. The network access may be provided via the production ESS following proper authentication of the device. The access point may determine the device to be properly authenticated as a function of an authentication received from the AAA server. The AAA server may be configured to generate an authentication as a function of the credential previously issued to the device as part of the automated provisioning process and thereafter transmitted to the AAA server, such as using EAP-TLS messaging. The access point may be configured to add an identifier or other construct to the EAP-TLS messaging in order to identify itself to the AAA server. The AAA server may utilize this identifier to determine whether the devices is accessing services at a particular location previously associated with the credential, e.g., whether the identifier matches an identifier previously associated with the credential. This determination may be useful in assessing whether the device is within its home or other full-service location or whether it is roaming or otherwise connected to a location where it may be entitled to lesser levels of service.

Figure 4:
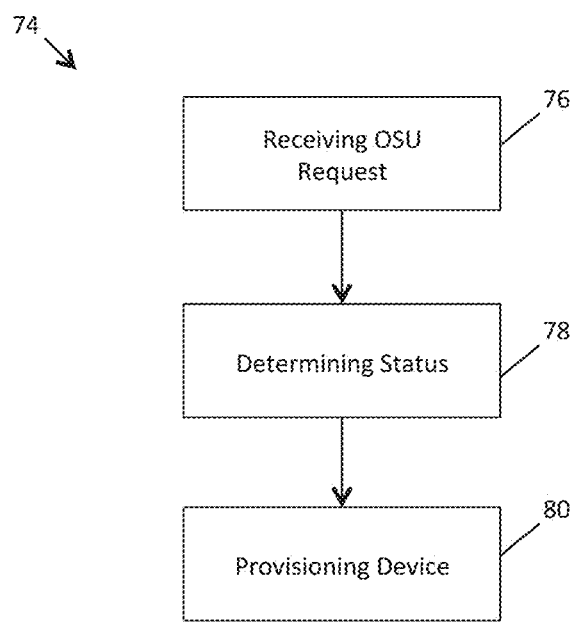
FIG. 4 illustrates a flowchart of method for controlling an OSU server in accordance with one non-limiting aspect of the present invention.

FIG. 4 illustrates a flowchart 74 of method for controlling an OSU server to facilitate provisioning in accordance with one non-limiting aspect of the present invention. The method may be embodied in a non-transitory computer-readable medium having a plurality of instructions operable with a processor or other logically executing feature of the OSU server and sufficient to facilitate the operations contemplated herein, including those described above with respect to the access point. The OSU server may be configured in accordance with the present invention to facilitate the operations described herein as well as with the capabilities and functionality described in Hotspot 2.0. Block 76 relates to the OSU server receiving an OSU request. The OSU request may be used to indicate a desire of the device to undertake an OSU operation whereby the device and/or user of the device are assessed to determine whether automated provisioning should be undertaken. Upon successful completion of the OSU operation, provisioning information, including a credential and/or a selection policy, may be provided to the device from the OSU server in a manner sufficient to enable the device to automatically provision itself for network access via the access point.

Block 78 relates to the OSU server determining a status for the device, such as but not necessary limited to an in-home status. The in-home status may be determined to be one of a first state and a second state depending on whether the devices within a near field range of the access point. The access point may be configured to determine a relative positioning of the device to the access point. The OSU server may rely on this to determine the first state if the device is within the near field range and the second state if the devices beyond the near field range or its proximity thereto is otherwise unknown. The access point may be configured to exchange signals with the device in order to facilitate determining the in-home status, such as by transmitting wireless signals at a lower power level or at a shorter range than the wireless signals associated with the OSU or production ESSs. The access point may rely upon Bluetooth, near field communications (NFC) and other signaling to perform the near field proximity test. Optionally, the proximity test may include a user of the device physically contacting the access point, such as by providing input to an HMI interface included on the access point while the test is being administered. While the status is described with respect to performing an in-home analysis, the present invention is not necessary so limited and fully contemplates the access point and/or the OSU server feel determining other statuses.

The OSU server may make the status determinations based on information provided from the access point and/or other backend resources, such as but not necessary limited to information provided from the AAA server. In addition to the proximity testing information generated by the access point, the access point may transmit other information to the OSU server, such as an identifier of itself. The identifier may be a Mac address, and IP address or other uniquely identifying information sufficient to differentiate the access point from other access points. The OSU server may rely upon the near field positioning of the device relative to the access point and the identifier of the access point to make any number of determinations, including determining whether the device should be provisioned without requiring additional information or without requiring a user thereof to provide identifying information, such as but not necessary limited to a username and password combination. The OSU server may check the near field data and if the in-home status is determined and the access point, or more particularly the identifier associated with access point, is authorized for service, then an automatic provisioning status may be determined. The automatic provisioning status may be used to enable provisioning of the device using ZSO in order to further ease the provisioning process.

Block 80 relates to the OSU server provisioning the device. The provisioning of the device may include the delivery of a credential and/or other provisioning information, such as but not necessary limited to a selection policy usable by the device to arbitrate amongst various production ESSs a may be available on the access point. Additional information, such as encryption keys, authentication tokens, etc., may be provided as part of the provisioning process. The provisioning information may include that described in the Hotspot 2.0 specification and/or otherwise include information sufficient to enable the access point to automatically connect to a specified connection of the wireless access point for the purposes of facilitating network access and/or other services available via the access point as contemplated by the present invention. One non-limiting aspect of the present invention contemplates facilitating the provisioning with ZSO. The ZSO provisioning may be characterized by the data, messages, etc. being used to provision the device to be transported via a TLS tunnel to the access point and installed therein such that the device automatically connects to the desired one or more of the available production ESSs. The ZSO may be characterized as delivering such information without requiring the user of the device to provide identification, such as a pin, a username and password combination or other confidential information.

In the event the in-home status is not determined or the access point is not authorized for ZSO provisioning, the identifying information not required for the ZSO provisioning may be acquired in order to authenticate the device and/or the user for OSU provisioning. An interface may be displayed on the device to receive information and for communication to the OSU server. OSU server may interact with the AAA server or otherwise include a database sufficient for authenticating the identifying information, and based on that authentication, determining whether to provide the provisioning information to the device. Optionally, this identification-based provisioning may be selectively employed in order to limit services or provide different provisioning depending on a user of the device, e.g., the ZSO provisioning does not require identifying information, or however, in some cases it may be beneficial to include such identifying information in order to provision the device to a particular user. The provisioning process, regardless of whether it is performed using ZSO or based on identifying information, may include providing a credential and other information to the device, including an authentication token. The authentication token may be installed in a browser of the device or other interface of the device in order to provide ZSO access to services available through the access point.

Figure 5:
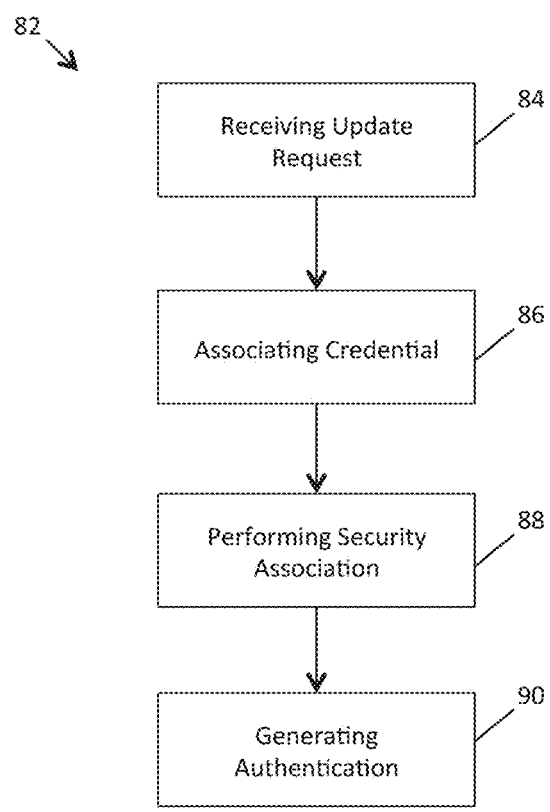
FIG. 5 illustrates a flowchart of method for controlling an AAA server in accordance with one non-limiting aspect of the present invention.

FIG. 5 illustrates a flowchart 82 of method for controlling an AAA server to facilitate authentication in accordance with one non-limiting aspect of the present invention. The method may be embodied in a non-transitory computer-readable medium having a plurality of instructions operable with a processor or other logically executing feature of the AAA server and sufficient to facilitate the operations contemplated herein, including those described above with respect to the access point and the OSU server. The AAA server may be configured in accordance with the present invention to facilitate the operations described herein as well as with the capabilities and functionality described in Hotspot 2.0. Block 84 relates to the AAA server receiving an update request indicating a desire of the OSU server to provision the device or that the OSU server has already provisioned the device. The credential provided to the device may be identified to the AAA server in order to enable the AAA server to subsequently verify the credential or other portions of the provisioning information when provided from the device. The update request may include the credential and/or other provisioning information provided to the device and/or associated therewith, such as the identifier and/or in-home status derived from the access point.

Block 86 relates to associating the credential with a database of the AAA server. The database may include a plurality of AAA identifiers for a plurality of access points. The AAA identifiers may be similar to the identifier used to uniquely identify the access point to the OSU server, which the AAA server may determine from the OSU server or other communications with the access points, a DHCP server and/or a trusted authority. The OSU server may provide the AAA server with the credential, the access point identifier and/or in-home status whereby the AAA server may then generate a new entry for the information within the database, such as by associating the received information with a corresponding AAA identifier and/or generate a new entry in the event a matching AAA identifier is unavailable. Block 88 relates to the AAA server performing a security Association. The security Association may be performed as a function of EAP-TLS messaging exchange between the device and the AAA server via the access point. The access point may be configured to include the identifier that was previously included within the messaging to the OSU server with the messaging to the AAA server, e.g., the identifier may be included as a supplemental data message included within a TLS messaging exchange between the device and the AAA server. In this manner, the access point may be configured in accordance with the present invention to add or otherwise provide identifiers within messaging exchange between the device and various servers in order to facilitate tagging the corresponding messages with unique identification information.

The device may be configured to transmit the credential previously provided by the OSU within the EAP-TLS messaging. The AAA server may compare the received credential with the identifier added by the access point to determine whether any corresponding entry has been created in the relational database, e.g., whether one of the AAA identifiers matches with the identifier included within the EAP-TLS messaging and/or whether one of the credentials in the database matches with the credential included within the EAP-TLS messaging. In the event a match occurs, the AAA server may generate a corresponding authentication in Block 90. The authentication may be used to grant privileges, entitlements or other capabilities to the device according to any format understood by the access point. One non-limiting aspect of the present invention contemplates requesting approval from a homeowner or other authority associated with the access point prior to authenticating access, such as by transmitting an e-mail to the authority or requiring the authority to accept or assent to network access using a webpage or similar interaction. Optionally, the authority may specify limits or other constraints on the granted authentication, such as providing parental control, bandwidth/priority restrictions, etc.

The access point may govern network access for the device according to the authentication generated with the AAA server. The authentication may be provided in accordance with Hotspot 2.0, and optionally, with additional parameters, such as service-level differentiators. One non-limiting aspect of the present invention contemplates providing service-level differentiators sufficient to enable the access point to vary network access for any number of devices connected thereto. This may include, for example, granting a particular device higher bandwidth/priority in comparison to another connected device, such as based on whether the device is connecting to their home location or a roaming location. The determination of whether the devices is at a home location or a roaming location may be based on whether the identifier included within the EAP-TLS messaging is noted within the database as being a home location of the device or a roaming location. The authentication may include instructions suitable to the operation access point in order to facilitate implementing the desired restrictions or service-level differentiators.

As supported above, the present invention relates to enabling subscribers from their home network to use their wireless device to select their MSO for online signup while also enabling subscriber accesses to the Internet with their wireless device over their home network. From a MSO Public Wi-Fi Network, the invention also enables subscribers to accesses the Internet with their wireless device over their MSOs public Wi-Fi network. The invention may enable: simple/automated provisioning of subscriber Wi-Fi devices, e.g., a sub only has to select MSO for OSU and/or a device may be provisioned for both Sub's residential network and MSO's public network; Wi-Fi links being secured automatically, including authentication and key exchange, credential installation, link layer encryption and WPA2-Enterprise security strength applied to subscriber's home network; the ability to identify each Wi-Fi device within the home, including enabling parental controls, separate service profiles for each household user and supporting roaming subscribers. The contemplated architecture may include a Passpoint compliant wireless device, Passpoint compliant AP embedded in a DOCSIS CM or other suitable gateway, a DOCSIS CMTS, and Back-End Servers, such as an AAA Server for providing access control to Wi-Fi network, a OSU server for checking subscriber registration and authentication status and configures Wi-Fi device, a DHCP server for provisioning IP addresses and a subscriber database containing subscriber credentials and service authorization data.

The invention may include the following processes: a subscriber CM MAC address and service authorization status being stored in the Subscriber Database along with their account credentials, the AP being configured with Passpoint discovery information using the eDOCSIS eSAFE provisioning mechanism (eCM config file, SNMP MIBs, or eSAFE specific method); the WiFi device discovering that the AP supports OSU and presents it to the subscriber; after the subscriber selects OSU the Wi-Fi device connects to the OSU server using HTTPS (TLS); and subscriber being authenticated, such as by using NFC (subscriber holds mobile device near their AP/CM gateway when selecting OSU. (other methods may be used e.g. bluetooth, WPS, pin) and/or OSU server identifies subscriber by CM MAC address lookup in subscriber database (source IP address can be resolved to CM MAC address using DHCP server) or with an Account password; the Wi-Fi device connecting to the Provisioning Server and downloading the necessary configuration data which includes their credentials as well as any needed trust anchors (root CA certs); the Wi-Fi device disconnecting from the OSU SSID and automatically connects to the main secure SSID of the AP using the credentials and other data it received from the provisioning server; setting up a Wi-Fi device connection, authentication, and security automatically going forward when connecting within the home; and when the Subscriber roams outside the home to a public Wi-Fi network supported by the MSO their Wi-Fi device automatically connecting thereto, optionally including the provisioning data configured the device with SSID, security, and roaming partner information using the same credentials outside of the home.

The present invention contemplates controlling/authorizing OSU access, such as according to the following processes: identifying in-home subscribers and roaming subscribers with the OSU in or AAA server, such as using near field communication technology (NFC); enabling the subscriber, following selection of the OSU, and ability to hold their mobile device next to their DOCSIS Passpoint AP so that the AP can forward the OSU request with an "in-home" tag if the same device is also detected via NFC and without the tag if the mobile devices associated with a roaming OSU requests; and associating OSU requests automatically with the subscriber's CM MAC address or requiring roaming OSU requests to obtain a registration page or an account password prompt; notifying via email when a new device has been added to in account via OSU to assure that only subscriber devices are associated to their account. Access from within the home can be controlled after a device is added to the network using OSU to approve a request link emailed to the primary account holder (subscriber), e.g., by preventing Internet access until the link is clicked on, or using password/PIN control. Since each device may be uniquely identified, filtering/parental controls and personalization settings can be applied using configuration settings on the subscriber's account management page.

The present invention contemplates a particular messaging format for the CM identifiers. For example, the access point or a CMTS associated therewith may add an identifier to TLS protocol messaging, such as manner described above. This data may be included in TLS ClientAuthz and AuthzDataFormat extension and supplemental data fields defined by RFC 4680, RFC 4366, and RFC 5878, the disclosures of which are hereby incorporated by reference in their entireties. The format of the CM Identifier data may consist of the following TLVs: CM MAC Address—Type=1, Length=6, Value=<6 octet MAC address>; and CM Authentication Status—Type=2, Length=value length, Value=<1 octet None(1), BPI(2), or BPI+(3)>. TLV Type and Length fields may be 1 octet.

The present invention contemplates facilitating roaming support, including enabling a single Passpoint Wi-Fi channel on the residential gateway to support roaming and in-home connections, such as by making roaming vs. in-home connection determinations by CM MAC address lookup in the subscriber database (source IP address can be resolved to CM MAC address using DHCP server) according to whether the CM MAC address match the address assigned to the subscriber's account, such to grant at-home subscribers are given a minimum amount bandwidth based on their service agreement whereas roamers are given best effort (different DOCSIS SIDs may be assigned to both). When using the Passpoint Online Sign-up feature for initial mobile device provisioning, an authentication session token can be installed on the subscriber's browser that can be used for zero sign-on/automatic authentication when the subscriber is accessing federated MSO and partner online services from any access network. This capability may be beneficial in leveraging use of Passpoint (Hotspot 2.0) Wi-Fi capabilities to provide a secure, seamless method for discovery, provisioning, and connecting to Wi-Fi networks. If the OSU server happens to be the service provider's SAML Identity Provider (IdP) server it can automatically install an authentication session token in the browser for the IdP domain while it is provisioning the mobile device with Wi-Fi settings. From that point on if the subscriber accesses MSO or partner services that are federated using SAML, with their browser they will be automatically authenticated by the IdP when it receives their authentication session token. It does not matter what network they are using to access the Internet.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for automatically provisioning a device to wirelessly connect to an access point, the method comprising:
   advertising an online signup (OSU) extended service set (ESS) and a production ESS from the access point, the OSU ESS sufficient for facilitating wireless signaling independently of the production ESS between the device and the access point for purposes of providing limited network access necessary for completing an OSU operation with an OSU server located upstream from the access point, the production ESS sufficient for facilitating wireless signaling independently of the OSU ESS between the device and the access point for purposes of providing essentially unlimited network access to a network upstream from the access point, the limited network access being characterized by the device being unable to communicate with servers other than necessary for communication with the OSU server and the unlimited network access being characterized by the device being able to communicate with servers other than the OSU server, the access point requiring an authentication for the device from an Authentication, Authorization and Accounting (AAA) server prior to granting the unlimited network access; and
   while the device is connected to the OSU ESS and unconnected to the production ESS:
   i) facilitating determination of a service provider (SP) associated with the device;

ii) facilitating transmission of an OSU request from the device to the OSU server associated with the service provider for purposes of conducting the OSU operation, including facilitating delivery of a credential and a selection policy from the OSU server to the device through the access point and the production ESS following successful completion of the OSU operation, the AAA server requiring the credential prior to issuing the authentication to the access point, the selection policy at least partially provisioning the device to subsequently disconnect from the OSU ESS and then connect to the production ESS for purposes of providing the unlimited network access to the network; and iii) facilitating use of a subscription construct for purposes of authorizing entitlements associated with the device.

2. The method of claim 1 further comprising instructing the device and/or the access point to generate the subscription construct by including a first access point identifier within messaging communicated from the device to the OSU server through the access point and the OSU ESS, the first access point identifier being sufficient for uniquely identifying the access point to the OSU server for purposes of enabling the OSU server to facilitate authorizing entitlements based at least in part on the access point associated with the first access point identifier.

3. The method of claim 2 further comprising instructing the device and/or the access point to add the first access point identifier within a supplemental data message transmitted from the device to the OSU server through the OSU ESS as part of the OSU operation.

4. The method of claim 3 further comprising instructing the access point to add the supplemental data message at the access point following communication of the supplemental data message from the device through the OSU ESS.

5. The method of claim 4 further comprising the supplemental data message being one of a plurality of Transport Layer Security (TLS) messages exchanged within a TLS tunnel constructed between the device and the OSU server via the OSU ESS.

6. The method of claim 2 further comprising instructing the device or the access point to generate the first access point identifier to identify a Media Access Control (MAC) address of the access point.

7. The method of claim 2 further comprising instructing the device and/or the access point to generate the subscription construct to include a proximity value for indicating whether the device is within a near field range of the access point.

8. The method claim 7 further comprising instructing the device and/or the access point to generate the proximity value to be a first value if the device is within the near field range and to be a second value if the device is not within the near field range.

9. The method of claim 7 further comprising instructing the device and/or the access point to determine the device to be within the near field range using near field signals exchanged between the device and the access point independently of the OSU ESS and the production ESS.

10. The method of claim 9 further comprising instructing the device and the access point to exchange the near field signals at a power level less than power levels associated with the OSU ESS and the production ESS such that the near field signals travel a shorter distance than related wireless signals transmitted from the access point for the OSU ESS and the production ESS.

11. The method of claim 10 further comprising instructing the access point to facilitate the wireless signals transmitted from the access point for the OSU ESS and the production ESS over different wireless channels, the different wireless channels having the power levels greater than the power level of the near field signals.

12. The method of claim 7 further comprising determining the device to be within the near field range if a corresponding user input to a human-machine interface (HMI) included on the access point is received proximate in time to the access point conducting a proximity test for the device.

13. The method of claim 1 further comprising instructing the device and/or the access point to facilitate:
exchange of Extensible Authentication Protocol Transport Layer Security (EAP-TLS) messaging between the device and the AAA server via the access point and the production ESS, the EAP-TLS messaging transporting the credential from the device through the production ESS to the AAA server for purposes of performing the authentication; and
transmission of a second identifier with the EAP-TLS messaging, the second identifier sufficient for uniquely identifying the access point to the AAA server for purposes of performing the authentication.

14. The method of claim 1 further comprising facilitating installation of the subscription construct within an Internet browser of the device, the subscription construct acting as a token/cookie sufficient to enable zero sign-on (ZSO) access to online services over the Internet as at least part of the network access via the production ESS.

15. A non-transitory computer-readable medium comprising a plurality of instructions operable with a processor of an online signup (OSU) server and sufficient for facilitating connection of a device to a wireless access point having a local area network (LAN) interface and a wide area network (WAN) interface, the LAN interface being configured to facilitate wireless signaling with the device and the WAN interface being configured to facilitate signaling associated with providing the device network access, the wireless access point providing an online signup (OSU) extended service set (ESS) and a production ESS via the LAN interface, the OSU ESS sufficient for establishing wireless signaling between the device and OSU server for the purposes of completing an OSU operation and the production ESS sufficient for establishing wireless signaling between the device and the access point for the purposes of providing network access, the access point requiring an authentication for the device from an Authentication, Authorization and Accounting (AAA) server prior to granting network access, the non-transitory computer-readable medium comprising instructions sufficient for:
receiving an OSU request from the device via the OSU ESS, the OSU request indicating a desire of the device to undertake the OSU operation in order to receive a credential and a selection policy from the OSU server, the AAA server requiring the credential prior to issuing the authentication to the access point, the selection policy at least partially provisioning the device to connect to the production ESS;
determining an in-home status for the device while undertaking the OSU operation, the in-home status being one of a first state and a second state, the first state indicating the device to be within a near field range of the access point associated with the OSU request and the second state indicating the device to be either beyond the near field range or indicating a position of the device relative to the access point associated with the OSU request being unknown; and providing the credential and the selection policy to the device upon receipt of an identification if the second state is determined and without receipt of the identification if the first state is determined, the identification being determined from a user input to the device as part of the OSU operation.

16. The non-transitory computer-readable medium of claim 15 further comprising instructions sufficient for determining the in-home status as a function of an OSU tag added by the access point as a supplemental data message to Transport Layer Security (TLS) messages exchanged between the device and the OSU server via the OSU ESS.

17. The non-transitory computer-readable medium of claim 15 further comprising instructions sufficient for providing an authentication cookie to the device as part of the OSU operation, the authentication cookie being suitable for use with an Internet browser of the device to enable zero sign-on (ZSO) access to online services accessed over the Internet via the production ESS.

18. A non-transitory computer-readable medium comprising a plurality of instructions operable with a processor to facilitate automatically provisioning a device to wirelessly connect to an access point, the plurality of instructions being sufficient for:

advertising an online signup (OSU) extended service set (ESS) and a production ESS from the access point, the OSU ESS sufficient for facilitating wireless signaling independently of the production ESS between the device and the access point for purposes of providing limited network access necessary for completing an OSU operation with an OSU server located upstream from the access point, the production ESS sufficient for facilitating wireless signaling independently of the OSU ESS between the device and the access point for purposes of providing essentially unlimited network access to a network upstream from the access point, the limited network access being characterized by the device being unable to communicate with servers other than necessary for communication with the OSU server and the unlimited network access being characterized by the device being able to communicate with servers other than the OSU server, the access point requiring an authentication for the device from an Authentication, Authorization and Accounting (AAA) server prior to granting the unlimited network access; and while the device is connected to the OSU ESS and unconnected to the production ESS:
i) facilitating determination of a service provider (SP) associated with the device;
ii) facilitating transmission of an OSU request from the device to the OSU server associated with the service provider for purposes of conducting the OSU operation, including facilitating delivery of a credential and a selection policy from the OSU server to the device through the access point and the production ESS following successful completion of the OSU operation, the AAA server requiring the credential prior to issuing the authentication to the access point, the selection policy at least partially provisioning the device to subsequently disconnect from the OSU ESS and then connect to the production ESS for purposes of providing the unlimited network access to the network; and facilitating use of a subscription construct for purposes of authorizing entitlements associated with the device.

19. The non-transitory computer-readable medium of claim 18 further comprising instructions sufficient for:

instructing the device and/or the access point to generate the subscription construct by including a first access point identifier within messaging communicated from the device to the OSU server through the access point and the OSU ESS, the first access point identifier being sufficient for uniquely identifying the access point to the OSU server for purposes of enabling the OSU server to facilitate authorizing entitlements based at least in part on the access point associated with the first access point identifier; and instructing the device and/or the access point to generate the subscription construct to include a proximity value for indicating whether the device is within a near field range of the access point.

20. The non-transitory computer-readable medium of claim 18 further comprising instructions sufficient for:

instructing the device and/or the access point to determine the device to be within the near field range using near field signals exchanged between the device and the access point independently of the OSU ESS and the production ESS;

instructing the device and the access point to exchange the near field signals at a power level less than power levels associated with the OSU ESS and the production ESS such that the near field signals travel a shorter distance than related wireless signals transmitted from the access point for the OSU ESS and the production ESS; and instructing the access point to facilitate the wireless signals transmitted from the access point for the OSU ESS and the production ESS over different wireless channels, the different wireless channels having the power levels greater than the power level of the near field signals.

\* \* \* \* \*